(12) United States Patent
Zhang et al.

(10) Patent No.: US 12,149,199 B2
(45) Date of Patent: Nov. 19, 2024

(54) FLEXIBLE EXCITATION SYSTEM AND CONTROL METHOD THEREFOR

(71) Applicant: GRID ZHEJIANG ELECTRIC POWER CO., LTD. RESEARCH INSTITUTE, Zhejiang (CN)

(72) Inventors: Jiancheng Zhang, Zhejiang (CN); Hongtao Xiong, Zhejiang (CN); Wen Hua, Zhejiang (CN); Ying Yang, Zhejiang (CN); Boliang Lou, Zhejiang (CN); Kuayu Wu, Zhejiang (CN); Xiaoming Huang, Zhejiang (CN); Weizhen Sun, Zhejiang (CN); Chengyu Lu, Zhejiang (CN); Qiulong Ni, Zhejiang (CN)

(73) Assignee: STATE GRID ZHEJIANG ELECTRIC POWER CO., LTD. RESEARCH INSTITUTE, Zhejiang (CN)

( * ) Notice: Subject to any disclaimer, the term of this patent is extended or adjusted under 35 U.S.C. 154(b) by 350 days.

(21) Appl. No.: 17/896,714

(22) Filed: Aug. 26, 2022

(65) Prior Publication Data

US 2022/0407316 A1 Dec. 22, 2022

Related U.S. Application Data

(63) Continuation-in-part of application No. PCT/CN2021/078062, filed on Feb. 26, 2021.

(30) Foreign Application Priority Data

Feb. 26, 2020 (CN) .......................... 202010119155.2
Mar. 19, 2020 (CN) .......................... 202010195910.5
Feb. 24, 2021 (CN) .......................... 202110210127.6

(51) Int. Cl.
*H02J 3/38* (2006.01)
*H02H 9/02* (2006.01)
(Continued)

(52) U.S. Cl.
CPC ................. *H02P 9/38* (2013.01); *H02H 9/02* (2013.01); *H02M 3/155* (2013.01); *H02M 7/217* (2013.01); *H02P 9/107* (2013.01); *H02P 9/305* (2013.01)

(58) Field of Classification Search
CPC . H02P 9/38; H02P 9/107; H02P 9/305; H02H 9/02; H02H 7/065; H02M 3/155;
(Continued)

(56) References Cited

U.S. PATENT DOCUMENTS 7,787,266 B2   8/2010   Janssen et al.
2020/0091831 A1*  3/2020   Kadota ............... H02M 5/4585
(Continued)

FOREIGN PATENT DOCUMENTS

CN    105471342 A    4/2016
CN    106828116 A    6/2017
(Continued)

OTHER PUBLICATIONS

Wu, "*Novel Flexible Excitation System based on multilevel topology technology*", Electric Power, vol. 52, No. 11, Nov. 30, 2019 (Nov. 30, 2019), pp. 100-106.
(Continued)

*Primary Examiner* — Joseph Ortega
(74) *Attorney, Agent, or Firm* — MUNCY, GEISSLER, OLDS & LOWE, P.C.

(57) ABSTRACT

The present application discloses a flexible excitation system and a method for controlling the same. The flexible excitation system consists of a plurality of groups of flexible excitation power units connected in parallel, a deexcitation
(Continued)

circuit unit and a flexible excitation control unit. The method for controlling the flexible excitation system includes: realizing the internal fault-tolerant operation control of the flexible excitation power units by cooperatively controlling AC circuit breakers and DC circuit breakers of the flexible excitation power units and a deexcitation switch; dynamically controlling ceiling voltage when terminal voltage drops by using the fast response control ability of the flexible excitation system, so as to improve the forced excitation output capacity of the self-shunt excitation system. Aiming at the possible overload problem of an excitation transformer during the operation of flexible excitation, an excitation transformer overload limiter for the flexible excitation system is provided to limit the operation state of the excitation transformer within an allowable overload operation range of equipment.

15 Claims, 5 Drawing Sheets

(51) Int. Cl.
*H02J 3/00* (2006.01)
*H02M 3/155* (2006.01)
*H02M 7/217* (2006.01)
*H02P 9/10* (2006.01)
*H02P 9/30* (2006.01)
*H02P 9/38* (2006.01)

(58) Field of Classification Search
CPC ...... H02M 7/217; H02M 1/007; H02M 3/158; H02M 7/219; H02M 1/32; H02M 7/81; H02J 3/36; H02J 3/38
See application file for complete search history.

(56) References Cited

U.S. PATENT DOCUMENTS

2021/0119449 A1* 4/2021 Wang ................. H02M 7/98
2021/0135455 A1* 5/2021 Marinopoulos ......... H02S 40/32

FOREIGN PATENT DOCUMENTS

| CN | 108599256 A | 9/2018 |
| CN | 109104128 A | 12/2018 |
| CN | 109390963 A | 2/2019 |

OTHER PUBLICATIONS

He, "Control Strategy of Voltage Source Converter Excitation System Based on Full Controlled Devices", Transactions of China Electrotechnical Society, vol. 27, No. 12, Dec. 31, (Dec. 31, 2012), pp. 24-247, 263.

* cited by examiner

FLEXIBLE EXCITATION SYSTEM AND CONTROL METHOD THEREFOR

CROSS REFERENCE TO RELATED APPLICATIONS

This application is a Continuation-in-Part of co-pending International Application No. PCT/CN2021/078062, filed on Feb. 26, 2021, for which priority is claimed under 35 U.S.C. § 120; and this application claims priority of application No. 202010119155.2 filed in China on Feb. 26, 2020, Application No. 202010195910.5 filed in China on Mar. 19, 2020, and application No. 202110210127.6 filed in China on Feb. 24, 2021 under 35 U.S.C. § 119, the entire contents of all of which are hereby incorporated by reference.

TECHNICAL FIELD

The present application belongs to the field of generator excitation systems, and in particular relates to a flexible excitation system and a method for controlling the same.

BACKGROUND

In recent years, with the large-scale development of new energy, the deepening of the energy transformation revolution, and the proposal of the "3060" carbon emission target, the power supply structure and power grid structure in the power system are undergoing great changes. The power grid is facing the "double high" development challenges of a high proportion of clean energy and a high proportion of power electronic devices. The pressure for safe and stable operation has increased greatly. Under the new situation, the flexibility of the power system to cope with extreme risks needs to be improved. After a large number of conventional generating units have been replaced by new energy, the stability and support capacity of the power grid has decreased, the operation risk of the power grid has increased, and the control means are scarce. To solve the above problems, if measures are taken in the primary system, the cost is high and the difficulty is great. If the excitation control system of the large synchronous generator and its control strategy can be improved, the effect will be more significant and the cost will be greatly reduced.

At present, the conventional generator excitation system is realized based on the semi-control device thyristor rectification, which can only control the turn-on and cannot control the turn-off of the control device. As a result, the conventional excitation system can only control the generator excitation voltage through phase controlled step-down rectification. When the grid voltage drops, the ceiling forced excitation output capacity of the generator set is limited, so it is not conducive to the voltage stability control of a high proportion of new energy grid. By applying the fully controlled power electronic device IGBT to the flexible excitation system and innovating the topology and control method, the essential improvement of the performance of the generator excitation system, which is the core equipment related to the stability control of the power grid, is realized from the bottom.

However, when the flexible excitation system composed of AC-DC and DC-DC power conversion circuits based on IGBT components is applied to the power generation excitation system, there are some disadvantages, such as weak current output capacity of single power device, imperfect forced excitation voltage control algorithm and imperfect reliability control algorithm. The existing technology does not meet the operation requirements on the high performance and high reliability of the generator and the excitation system.

SUMMARY

The technical problem to be solved by the present application is to overcome the defects of the existing technology, by providing a flexible excitation system and a method for controlling the same, so as to realize the large current output application of the flexible excitation system, give play to the high forced excitation multiple, and improve the fault-tolerant operation ability of the flexible excitation system at the same time.

In order to achieve the purpose, the present application adopts the following technical solution:

In a first aspect, the present application provides a flexible excitation system, which includes a plurality of groups of flexible excitation power units connected in parallel, a deexcitation circuit unit and a flexible excitation control unit;

each flexible excitation power unit includes a front-stage bidirectional AC-DC converter and a rear-stage bidirectional DC-DC converter; the front-stage bidirectional AC-DC converter is connected with the rear-stage bidirectional DC-DC converter through an intermediate DC capacitor circuit; a three-phase AC input side of the front-stage bidirectional AC-DC converter is an input side of the flexible excitation power unit; a DC output side of the rear-stage bidirectional DC-DC converter is an output side of the flexible excitation power unit; the input sides of the plurality of groups of flexible excitation power units are respectively configured with AC side filter reactors and AC circuit breakers connected in series, then are connected in parallel, and are connected with a three-phase AC low-voltage side of an excitation transformer, and a three-phase AC high-voltage side of the excitation transformer is connected with a generator terminal; the output sides of the plurality of groups of flexible excitation power units are respectively configured with DC side filter reactors and DC circuit breakers connected in series, and then are connected in parallel for output;

the deexcitation circuit unit consists of a deexcitation switch and a deexcitation resistor circuit; the deexcitation resistor circuit consists of a nonlinear deexcitation resistor and a diode connected in series, and is connected across positive and negative poles of a generator excitation winding, a positive pole of the diode is connected with the negative pole of the generator excitation winding, a negative pole of the diode is connected with one end of the nonlinear deexcitation resistor, and the other end of the nonlinear deexcitation resistor is connected with the positive pole of the generator excitation winding;

the parallel output positive poles of the plurality of groups of flexible excitation power units are connected with the positive pole of the generator excitation winding through the deexcitation switch; the parallel output negative poles of the plurality of groups of flexible excitation power units are connected with the negative pole of the generator excitation winding or are connected with the deexcitation switch in series and then connected with the negative pole of the generator excitation winding;

the flexible excitation control unit is used to cooperatively control the AC circuit breakers and the DC circuit breakers of the flexible excitation power units and the deexcitation switch, so as to realize the internal fault-tolerant operation control of the flexible excitation power units;

the flexible excitation control unit is further used to dynamically control ceiling voltage by using the fast response control ability of the flexible excitation system when terminal voltage drops, so as to improve the forced excitation output capacity of the excitation system;

the flexible excitation control unit is further used to limit the operation state of the excitation transformer within an allowable overload operation range of equipment.

Further, the front-stage bidirectional AC-DC converter is a three-level voltage source converter; the post-stage bidirectional DC-DC converter is a five-level H-bridge DC converter; the intermediate DC capacitor circuit includes two groups of front-stage and rear-stage intermediate DC capacitor units connected in parallel;

a DC output side of the three-level voltage source converter is connected with the front-stage intermediate DC capacitor unit through a positive pole, a neutral point and a negative pole; a DC input side of the five-level H-bridge DC converter is connected with the rear-stage intermediate DC capacitor unit through a positive pole, a neutral point and a negative pole;

the intermediate DC capacitor unit includes two groups of top bridge DC capacitor banks and bottom bridge DC capacitor banks connected in series, a positive pole of the top bridge DC capacitor bank is a positive pole of the intermediate DC capacitor unit, a negative pole of the top bridge DC capacitor bank is connected with a positive pole of the bottom bridge DC capacitor bank to form a neutral point of the intermediate DC capacitor unit, and a negative pole of the bottom bridge DC capacitor bank is a negative pole of the intermediate DC capacitor unit; the front-stage intermediate DC capacitor unit and the rear-stage intermediate DC capacitor unit are connected only through the positive pole and the negative pole.

In a second aspect, the present application provides a method for controlling a flexible excitation system, which is applied to the flexible excitation system in the first aspect.

The flexible excitation control unit includes an excitation transformer overload limiter, and the excitation transformer overload limiter includes an excitation transformer overload signal detection circuit, an excitation transformer overload state determination circuit and an excitation transformer overload action circuit;

the flexible excitation control unit limits the operation state of the excitation transformer within an allowable overload operation range of equipment, specifically including the following steps that:

the excitation transformer overload signal detection circuit is used to detect a signal indicative of an excitation transformer load operation state and transmit the signal to the excitation transformer overload state determination circuit;

the excitation transformer overload state determination circuit calculates and determines whether the excitation transformer exceeds an allowable overload operation state of equipment by using the detected signal, obtains an excitation transformer overload limiting action signal, and transmits the excitation transformer overload limiting action signal to the excitation transformer overload action circuit;

the excitation transformer overload action circuit limits the operation state of the excitation transformer within the allowable overload operation range of equipment by controlling a control process variable of the flexible excitation system after receiving the excitation transformer overload limiting action signal.

In an implementation example, the excitation transformer overload signal detection circuit obtains excitation transformer temperature through a temperature measurement device; the excitation transformer overload state determination circuit obtains the excitation transformer overload limiting action signal by comparing the excitation transformer temperature with an excitation transformer over-temperature fixed value.

In an implementation example, the excitation transformer overload signal detection circuit obtains excitation transformer current through a current measurement device; the excitation transformer overload state determination circuit calculates the accumulated heat of the excitation transformer winding through the excitation transformer current, and compares the accumulated heat with an excitation transformer winding overload heat fixed value to obtain the excitation transformer overload limiting action signal.

In an implementation example, when the excitation transformer overload limiting action signal occurs, the excitation transformer overload action circuit acts to reduce the excitation voltage output limit of the rear-stage bidirectional DC-DC converter, and makes an adjustment in real time according to the following formula: excitation voltage output limit=(conservative coefficient of limiting action*actually measured per-unit value of terminal voltage*rated voltage on secondary side of excitation transformer*rated current on secondary side of excitation transformer)/actually measured value of excitation current.

In an implementation example, when the excitation transformer overload limiting action signal occurs, the excitation transformer overload action circuit acts to reduce the current limit of the input link of the front-stage bidirectional AC-DC converter, which is limited according to the following formula: current limit=conservative coefficient of limiting action*rated current on secondary side of excitation transformer.

In a third aspect, the present application provides a method for controlling a flexible excitation system, which is applied to the flexible excitation system in the first aspect. The flexible excitation control unit cooperatively controls the AC circuit breakers and DC circuit breakers of the flexible excitation power units and the deexcitation switch, specifically including the following steps that:

when a non-serious operation fault of the front-stage bidirectional AC-DC converter of any flexible excitation power unit is detected, all the front-stage bidirectional AC-DC converters of the flexible excitation power units connected in parallel are locked to enter an uncontrolled rectification operation state, and the rear-stage bidirectional DC-DC converters are limited to only allow unidirectional power output control, so as to maintain the operation of the flexible excitation system;

when a serious operation fault of the front-stage bidirectional AC-DC converter of any flexible excitation power unit and a fault of the rear-stage bidirectional DC-DC converter are detected, and there are still other flexible excitation power units capable of maintaining the normal operation of a generator set, the AC circuit breaker and DC circuit breaker of the flexible excitation power unit are immediately controlled to trip, and the fault power unit is removed from the parallel system so that the remaining system operates normally;

when a serious operation fault of the front-stage bidirectional AC-DC converter of any flexible excitation power unit and a fault of the rear-stage bidirectional DC-DC converter are detected, and the remaining other flexible excitation power units are not capable of maintaining the normal operation of the generator set, the deexcitation switch of the flexible excitation system is immediately controlled to trip so that the entire system stops operating.

In this embodiment, the non-serious operation fault of the front-stage bidirectional AC-DC converter refers to a fault form such as abnormal locking of control pulse or phase-locked instability which does not cause a serious loss to equipment; the serious operation fault of the front-stage bidirectional AC-DC converter refers to a fault form such as overcurrent or overvoltage which causes a serious loss to equipment.

In a fourth aspect, the present application provides a method for controlling a flexible excitation system, which is applied to the flexible excitation system in the first aspect. The intermediate DC voltage of the intermediate DC capacitor circuit is the ceiling voltage of the flexible excitation system and is called the intermediate DC voltage of the flexible excitation system; when the terminal voltage drops, the flexible excitation control unit dynamically controls the ceiling voltage by using the fast response control ability of the flexible excitation system, specifically including the following steps:

S1: in a process from no-load excitation of a synchronous generator to grid connection, an inverter deexcitation process after grid disconnection, or a deexcitation process after the synchronous generator receives a deexcitation switch trip order under any working condition, controlling the intermediate DC voltage of the flexible excitation system according to the change of the terminal voltage by adopting a conventional two-stage control strategy;

S2: after the grid connection of the synchronous generator, controlling the intermediate DC voltage of the flexible excitation system according to two operation intervals of the generator terminal voltage, including a conventional operation interval in which the generator terminal voltage is higher than conventional knee voltage and an emergency operation interval in which the generator terminal voltage is lower than the conventional knee voltage;

A1) when the generator terminal voltage is in the conventional operation interval, controlling the intermediate DC voltage of the flexible excitation system according to a conventional fixed DC voltage setting value;

A2) when the generator terminal voltage is in the emergency operation interval, controlling the intermediate DC voltage of the flexible excitation system according to the change of the generator terminal voltage by adopting the emergency two-stage control strategy.

In an implementation example, the conventional two-stage control strategy specifically includes the following content:

according to the difference of the generator terminal voltage, the interval is divided into a conventional linear step-up interval and a conventional constant voltage interval, the conventional linear step-up interval refers to a range of the generator terminal voltage from zero to the conventional knee voltage, and the conventional constant voltage interval refers to a range of the generator terminal voltage above the conventional knee voltage;

in the conventional linear step-up interval, the intermediate DC voltage of the flexible excitation system is controlled according to a fixed conventional step-up ratio setting value relative to the secondary line voltage of the excitation transformer, that is, the intermediate DC voltage is equal to the secondary line voltage of the excitation transformer multiplied by the conventional step-up ratio; in the conventional constant voltage range, the intermediate DC voltage of the flexible excitation system is controlled according to a conventional fixed intermediate DC voltage setting value.

In an implementation example, a relationship between the conventional knee voltage and the conventional step-up ratio and the conventional fixed intermediate DC voltage is as follows:

(conventional knee voltage/rated value of generator terminal voltage)*rated value of secondary line voltage of excitation transformer*conventional step-up ratio=conventional fixed intermediate DC voltage.

In an implementation example, the emergency two-stage control strategy specifically includes the following content:

according to the difference of the generator terminal voltage, the interval is divided into an emergency linear step-up interval and an emergency constant voltage interval, the emergency linear step-up interval refers to a range of the generator terminal voltage from zero to emergency knee voltage, and the emergency constant voltage interval refers to a range of the generator terminal voltage from the emergency knee voltage to normal knee voltage;

in the emergency linear step-up interval, the intermediate DC voltage of the flexible excitation system is controlled according to a fixed emergency step-up ratio setting value relative to the secondary line voltage of the excitation transformer, that is, the intermediate DC voltage is equal to the secondary line voltage of the excitation transformer multiplied by emergency step-up ratio; in the emergency constant voltage interval, the intermediate DC voltage of the flexible excitation system is controlled according to a fixed emergency DC voltage setting value.

In an implementation example, a relationship between the emergency knee voltage of the generator terminal voltage and the emergency step-up ratio and emergency fixed intermediate DC voltage setting value is as follows:

(emergency knee voltage/rated value of generator terminal voltage)*rated value of secondary line voltage of excitation transformer*emergency step-up ratio=emergency fixed intermediate DC voltage.

In an implementation example, when the generator in a grid connected state enters the emergency operation interval, the generator terminal voltage is required to be restored within the conventional operation interval of the normal knee voltage and exceed a set control dead zone so that the intermediate DC voltage of the flexible excitation system is capable of being restored to be controlled according to the conventional fixed DC voltage setting value.

The present application has the following beneficial effects: 1) The flexible excitation system provided by the present application breaks through the current output bottleneck of the IGBT device by connecting a plurality of groups of power units in parallel, and realizes the high current output application of the flexible excitation system. At the same time, the topology of AC and DC double-side parallel connection, combined with the cooperative control of the circuit breakers and the deexcitation switch, is easy to realize the N−1 redundant fault-tolerant control of the excitation system and improve the operation reliability of the device. In addition, for the three-level flexible excitation system, the decoupling design topology of the front-stage and rear-stage neutral points of the power unit is provided to reduce the flow path of the parasitic circuit, which is helpful to reduce the circulation problem between the plurality of groups of power units connected in parallel. 2) The dynamic ceiling voltage control method provided by the present application based on the flexible excitation system makes full use of the fast response control ability of the flexible excitation system, and flexibly adjusts the intermediate DC voltage according to the demand, so as to improve the forced excitation output ability of the self-shunt excitation system in case of system voltage fault and drop, and greatly improve the transient stability control ability of the power system. 3) The excitation transformer overload limiter of the flexible excitation system provided by the present application can not only give full play to the high forced excitation capacity of the flexible excitation system, but also improve the shortcomings of the existing excitation limiting control, effectively protect the excitation transformer and ensure the reliability of the overall operation of the flexible excitation system.

DETAILED DESCRIPTION OF THE EMBODIMENTS

The present application will be further described below in combination with the embodiments with reference to the drawings of the description, but the scope of protection of the present application is not limited to the following embodiments. Within the spirit and the scope of protection of claims of the present application, any modifications and changes made to the present application fall within the scope of protection of the present application.

Embodiment 1

Figure 1A:
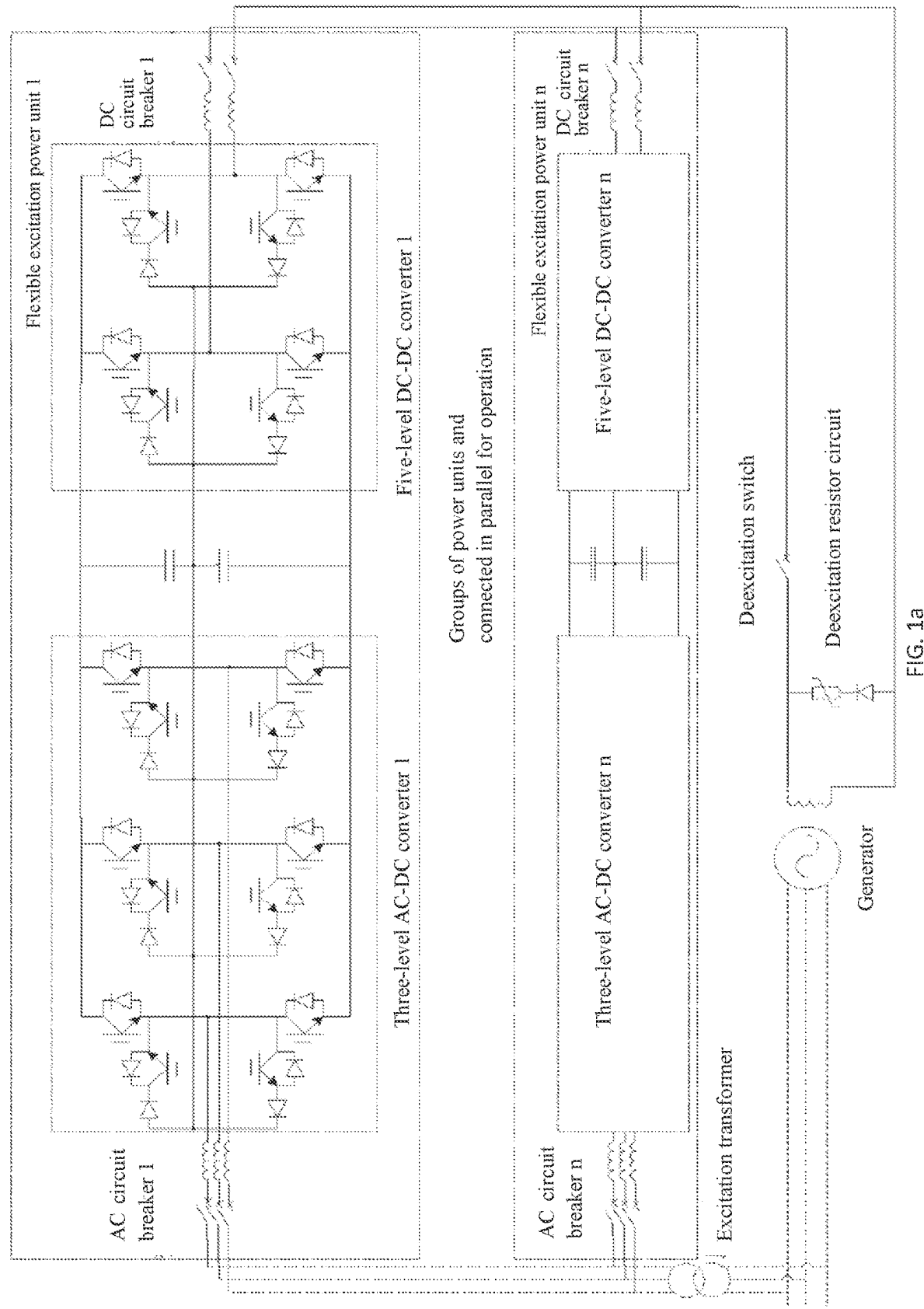
FIG. 1a illustrates a topology diagram of a flexible excitation system in a specific embodiment of the present application.

A flexible excitation system provided by this embodiment, as illustrated in FIG. 1a, includes a plurality of groups of flexible excitation power units connected in parallel, a deexcitation circuit unit and a flexible excitation control unit;

each flexible excitation power unit includes a front-stage bidirectional AC-DC converter and a rear-stage bidirectional DC-DC converter; the front-stage bidirectional AC-DC converter is connected with the rear-stage bidirectional DC-DC converter through an intermediate DC capacitor circuit; a three-phase AC input side of the front-stage bidirectional AC-DC converter is an input side of the flexible excitation power unit; a DC output side of the rear-stage bidirectional DC-DC converter is an output side of the flexible excitation power unit; the input sides of the plurality of groups of flexible excitation power units are respectively configured with AC side filter reactors and AC circuit breakers connected in series, then are connected in parallel, and are connected with a three-phase AC low-voltage side of an excitation transformer, and a three-phase AC high-voltage side of the excitation transformer is connected with a generator terminal; the output sides of the plurality of groups of flexible excitation power units are respectively configured with DC side filter reactors and DC circuit breakers connected in series, and then are connected in parallel for output;

the deexcitation circuit unit consists of a deexcitation switch and a deexcitation resistor circuit; the deexcitation resistor circuit consists of a nonlinear deexcitation resistor and a diode connected in series, and is connected across positive and negative poles of a generator excitation winding, a positive pole of the diode is connected with the negative pole of the generator excitation winding, a negative pole of the diode is connected with one end of the nonlinear deexcitation resistor, and the other end of the nonlinear deexcitation resistor is connected with the positive pole of the generator excitation winding; the parallel output positive poles of the plurality of groups of flexible excitation power units are connected with the positive pole of the generator excitation winding through the deexcitation switch; the parallel output negative poles of the plurality of groups of flexible excitation power units may be directly connected with the negative pole of the generator excitation winding or may be connected with the deexcitation switch in series and then connected with the negative pole of the generator excitation winding;

the flexible excitation control unit is used to cooperatively control the AC circuit breakers and the DC circuit breakers of the flexible excitation power units and the deexcitation switch, so as to realize the internal fault-tolerant operation control of the flexible excitation power units;

the flexible excitation control unit is further used to dynamically control ceiling voltage by using the fast response control ability of the flexible excitation system when terminal voltage drops, so as to improve the forced excitation output capacity of the excitation system;

the flexible excitation control unit is further used to limit the operation state of the excitation transformer within an allowable overload operation range of equipment.

In another preferred embodiment, the flexible excitation control unit in the flexible excitation system in this embodiment may be a processor, a single-chip microcomputer or other data processing chip.

Figure 1B:
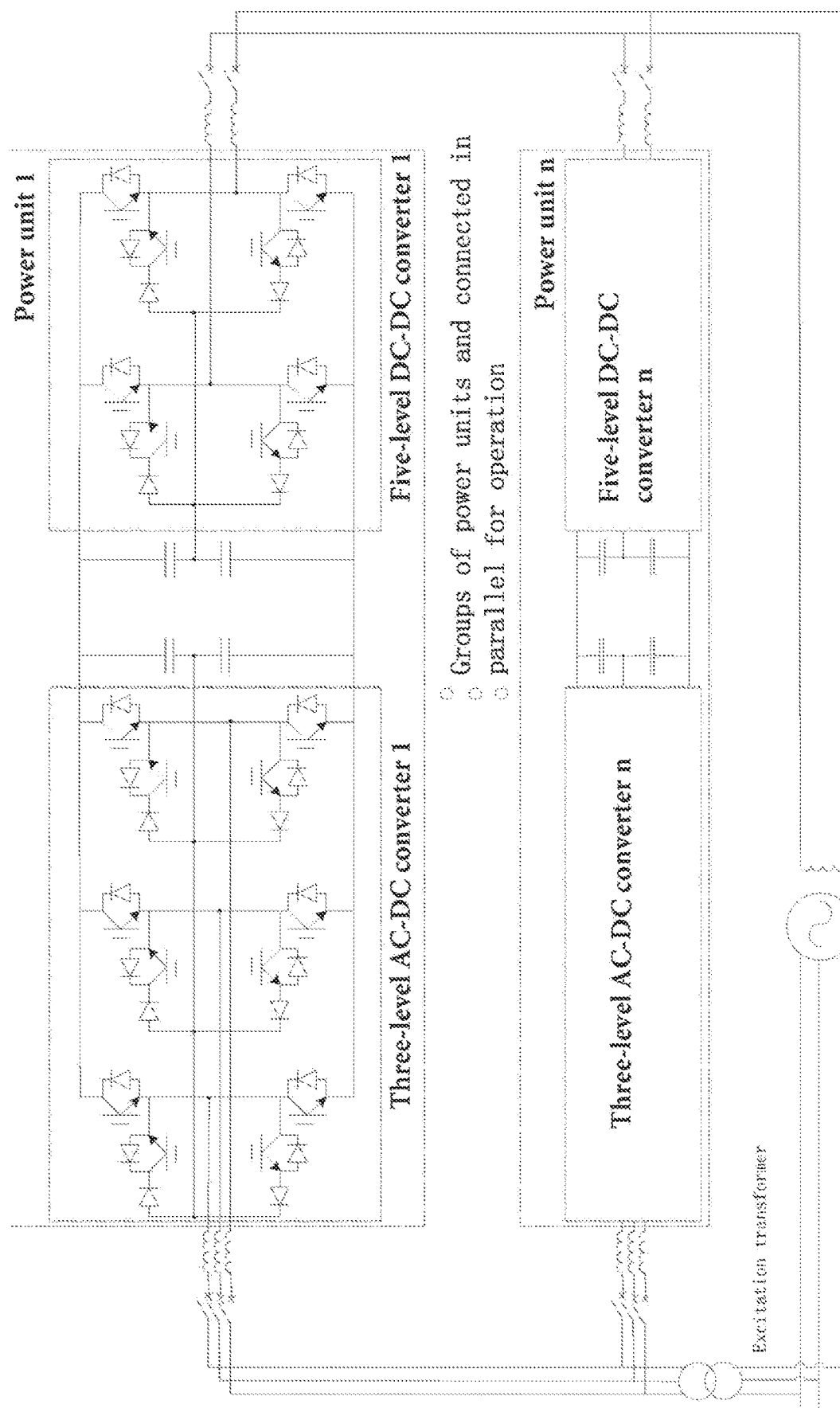
FIG. 1B illustrates a neutral point decoupling topology diagram of a flexible excitation system in a specific embodiment of the present application.

In another preferred embodiment, as illustrated in FIG. 1B, the intermediate DC capacitor circuit in the flexible excitation system in this embodiment includes two groups of front-stage and rear-stage intermediate DC capacitor units connected in parallel; the intermediate DC capacitor unit includes two groups of top bridge DC capacitor banks and bottom bridge DC capacitor banks connected in series, a positive pole of the top bridge DC capacitor bank is a positive pole of the intermediate DC capacitor unit, a negative pole of the top bridge DC capacitor bank is connected with a positive pole of the bottom bridge DC capacitor bank to form a neutral point of the intermediate DC capacitor unit, and a negative pole of the bottom bridge DC capacitor bank is a negative pole of the intermediate DC capacitor unit; the front-stage intermediate DC capacitor unit and the rear-stage intermediate DC capacitor unit are connected only through the positive pole and the negative pole.

The front-stage bidirectional AC-DC converter is a three-level voltage source converter; the post-stage bidirectional DC-DC converter is a five-level H-bridge DC converter; a DC output side of the three-level voltage source converter is connected with the front-stage intermediate DC capacitor unit through a positive pole, a neutral point and a negative pole; a DC input side of the five-level H-bridge DC converter is connected with the rear-stage intermediate DC capacitor unit through a positive pole, a neutral point and a negative pole.

The flexible excitation system provided by this embodiment breaks through the current output bottleneck of the IGBT device by connecting a plurality of groups of power units in parallel, and realizes the high current output application of the flexible excitation system. At the same time, the topology of AC and DC double-side parallel connection, combined with the cooperative control of the circuit breakers and the deexcitation switch, is easy to realize the N−1 redundant fault-tolerant control of the excitation system and improve the operation reliability of the device. In addition, for the three-level flexible excitation system, the decoupling design topology of the front-stage and rear-stage neutral points of the power unit is provided to reduce the flow path of the parasitic circuit, which is helpful to reduce the circulation problem between the plurality of groups of power units connected in parallel.

Embodiment 2

A method for controlling a flexible excitation system provided by this embodiment is applied to the flexible excitation system in embodiment 1.

In the method for controlling the flexible excitation system provided by this embodiment, the flexible excitation control unit limits the operation state of the excitation transformer within an allowable overload operation range of equipment, specifically including the following steps that:

the excitation transformer overload signal detection circuit is used to detect a signal indicative of an excitation transformer load operation state and transmit the signal to the excitation transformer overload state determination circuit;

the excitation transformer overload state determination circuit calculates and determines whether the excitation transformer exceeds an allowable overload operation state of equipment by using the detected signal, obtains an excitation transformer overload limiting action signal, and transmits the excitation transformer overload limiting action signal to the excitation transformer overload action circuit;

the excitation transformer overload action circuit limits the operation state of the excitation transformer within the allowable overload operation range of equipment by controlling a control process variable of the flexible excitation system after receiving the excitation transformer overload limiting action signal.

Figure 2:
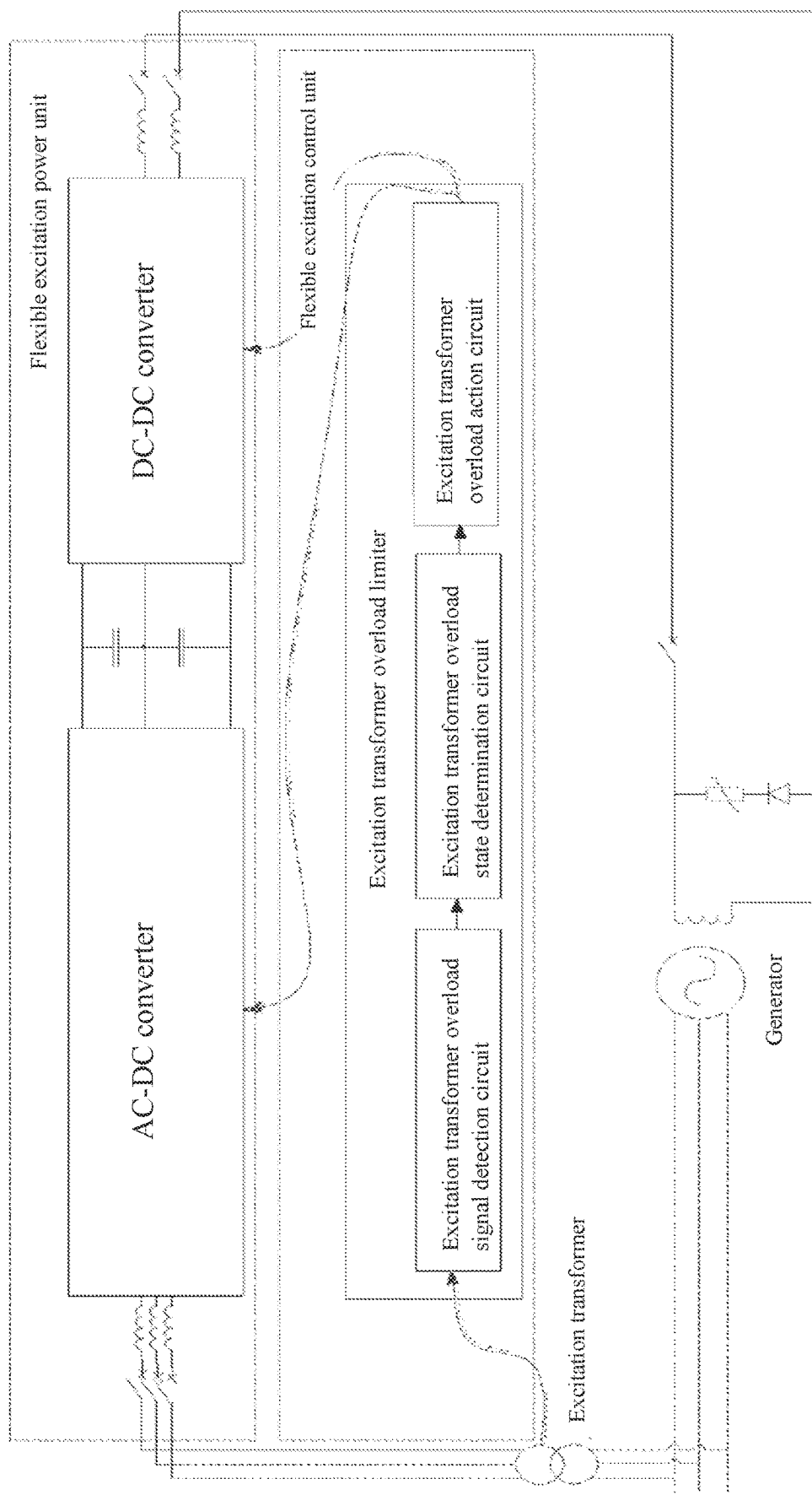
FIG. 2 illustrates a control block diagram of an excitation transformer overload limiter of a flexible excitation system in a specific embodiment of the present application.

The flexible excitation control unit includes an excitation transformer overload limiter which is used to control the excitation transformer current within an allowable overload operation range of equipment. A control diagram is as illustrated in FIG. 2.

The excitation transformer overload limiter includes an excitation transformer overload signal detection circuit, an excitation transformer overload state determination circuit and an excitation transformer overload action circuit.

The excitation transformer overload signal detection circuit obtains excitation transformer current through a current measurement device; the excitation transformer overload state determination circuit calculates the accumulated heat of the excitation transformer winding through the excitation transformer current, and compares the accumulated heat with an excitation transformer winding overload heat fixed value to obtain the excitation transformer overload limiting action signal.

When the excitation transformer overload limiting action signal occurs, the excitation transformer overload action circuit acts to reduce the excitation voltage output limit of the rear-stage bidirectional DC-DC converter, and makes an adjustment in real time according to the following formula: excitation voltage output limit=(conservative coefficient of limiting action*actually measured per-unit value of terminal voltage*rated voltage on secondary side of excitation transformer*rated current on secondary side of excitation transformer)/actually measured value of excitation current. The conservative coefficient of the limiting action may be set as 0.8-0.9.

The excitation transformer overload limiter of the flexible excitation system provided by this embodiment can not only give full play to the high forced excitation capacity of the flexible excitation system, but also improve the shortcomings of the existing excitation limiting control, effectively protect the excitation transformer and ensure the reliability of the overall operation of the flexible excitation system.

Embodiment 3

It is applied to the flexible excitation system in embodiment 1.

This embodiment provides a method for controlling a flexible excitation system. The overall control diagram of the excitation transformer overload limiter is the same as that in embodiment 2, as illustrated in FIG. 2. The excitation transformer overload signal detection circuit obtains excitation transformer temperature through a temperature measurement device; the excitation transformer overload state determination circuit obtains the excitation transformer overload limiting action signal by comparing the excitation transformer temperature with an excitation transformer over-temperature fixed value.

When the excitation transformer overload limiting action signal occurs, the excitation transformer overload action circuit acts to reduce the current limit of the input link of the front-stage bidirectional AC-DC converter, which is limited according to the following formula: three-phase AC input current limit=conservative coefficient of limiting action*rated current on secondary side of excitation transformer. The conservative coefficient of the limiting action may be set as 0.8-0.9.

Other parts are the same as that in embodiment 2.

The excitation transformer overload limiter of the flexible excitation system provided by this embodiment can not only give full play to the high forced excitation capacity of the flexible excitation system, but also improve the shortcomings of the existing excitation limiting control, effectively protect the excitation transformer and ensure the reliability of the overall operation of the flexible excitation system.

Embodiment 4

This embodiment provides a method for controlling a flexible excitation system. The overall control diagram of the excitation transformer overload limiter is the same as that in embodiment 2, as illustrated in FIG. 2.

The excitation transformer overload signal detection circuit obtains excitation transformer current through a current measurement device; the excitation transformer overload state determination circuit compares the excitation transformer temperature with an excitation transformer over-temperature fixed value to obtain the excitation transformer overload limiting action signal.

when the excitation transformer overload limiting action signal occurs, the excitation transformer overload action circuit acts to reduce the excitation voltage output limit of the rear-stage bidirectional DC-DC converter, and makes an adjustment in real time according to the following formula: excitation voltage output limit=(conservative coefficient of limiting action*actually measured per-unit value of terminal voltage*rated voltage on secondary side of excitation transformer*rated current on secondary side of excitation transformer)/actually measured value of excitation current. The conservative coefficient of the limiting action may be set as 0.8-0.9.

Other parts are the same as that in embodiment 2.

The excitation transformer overload limiter of the flexible excitation system provided by this embodiment can not only give full play to the high forced excitation capacity of the flexible excitation system, but also improve the shortcomings of the existing excitation limiting control, effectively protect the excitation transformer and ensure the reliability of the overall operation of the flexible excitation system.

Embodiment 5

This embodiment provides a method for controlling a flexible excitation system. The overall control diagram of the excitation transformer overload limiter is the same as that in embodiment 2, as illustrated in FIG. 2. The excitation transformer overload signal detection circuit obtains excitation transformer current through a current measurement device; the excitation transformer overload state determination circuit calculates the accumulated heat of the excitation transformer winding through the excitation transformer current, and compares the accumulated heat with an excitation transformer winding overload heat fixed value to obtain the excitation transformer overload limiting action signal.

When the excitation transformer overload limiting action signal occurs, the excitation transformer overload action circuit can also act to reduce the current limit of the input link of the front-stage bidirectional AC-DC converter, which is limited according to the following formula: three-phase AC input current limit=conservative coefficient of limiting action*rated current on secondary side of excitation transformer. The conservative coefficient of the limiting action may be set as 0.8-0.9.

Other parts are the same as that in embodiment 2.

The excitation transformer overload limiter of the flexible excitation system provided by this embodiment can not only give full play to the high forced excitation capacity of the flexible excitation system, but also improve the shortcomings of the existing excitation limiting control, effectively protect the excitation transformer and ensure the reliability of the overall operation of the flexible excitation system.

Embodiment 6

This embodiment provides a method for controlling a flexible excitation system, which is applied to the flexible excitation system in embodiment 1.

The flexible excitation control unit cooperatively controls the AC circuit breakers and DC circuit breakers of the flexible excitation power units and the deexcitation switch to realize the internal fault-tolerant operation control of the flexible excitation power units, specifically including the following steps that:

when a non-serious operation fault of the front-stage bidirectional AC-DC converter of any flexible excitation power unit is detected, all the front-stage bidirectional AC-DC converters of the flexible excitation power units connected in parallel are locked to enter an uncontrolled rectification operation state, and the rear-stage bidirectional DC-DC converters are limited to only allow unidirectional power output control, so as to maintain the operation of the flexible excitation system;

when a serious operation fault of the front-stage bidirectional AC-DC converter of any flexible excitation power unit and a fault of the rear-stage bidirectional DC-DC converter are detected, and there are still other flexible excitation power units capable of maintaining the normal operation of a generator set, the AC circuit breaker and DC circuit breaker of the flexible excitation power unit are immediately controlled to trip, and the fault power unit is removed from the parallel system so that the remaining system operates normally;

when a serious operation fault of the front-stage bidirectional AC-DC converter of any flexible excitation power unit and a fault of the rear-stage bidirectional DC-DC converter are detected, and the remaining other flexible excitation power units are not capable of maintaining the normal operation of the generator set, the deexcitation switch of the flexible excitation system is immediately controlled to trip so that the entire system stops operating.

In this embodiment, the non-serious operation fault of the front-stage bidirectional AC-DC converter refers to a fault form such as abnormal locking of control pulse or phase-locked instability which does not cause a serious loss to equipment; the serious operation fault of the front-stage bidirectional AC-DC converter refers to a fault form such as overcurrent or overvoltage which causes a serious loss to equipment.

Embodiment 7

This embodiment provides a method for controlling a flexible excitation system, which is applied to the flexible excitation system in embodiment 1.

Figure 3:
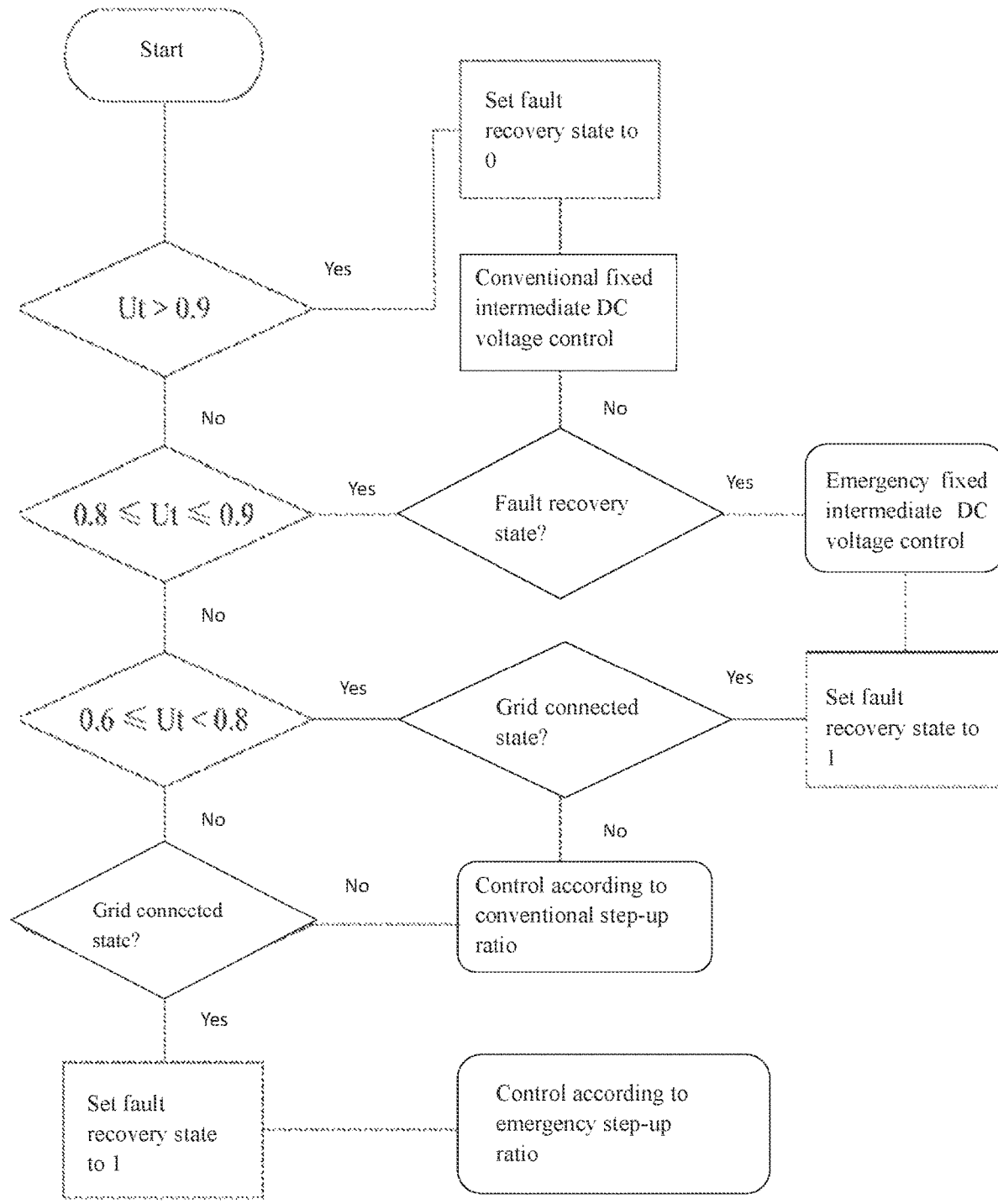
FIG. 3 illustrates a control logic block diagram of a flexible excitation system control method in a specific embodiment of the present application.

The method for controlling the flexible excitation system provided by this embodiment realizes the dynamic ceiling voltage control of the flexible excitation system by controlling the intermediate DC voltage of the intermediate DC capacitor circuit. A control logic diagram is as illustrated in FIG. 3. In this embodiment, the rated value of the voltage on the secondary side of the excitation transformer is two times the rated value of the excitation voltage. The intermediate DC voltage of the intermediate DC capacitor circuit is the ceiling voltage of the flexible excitation system and is called the intermediate DC voltage of the flexible excitation system.

The flexible excitation control unit dynamically controls the ceiling voltage by using the fast response control ability of the flexible excitation system, specifically including step S1 and step S2:

In step S1, in a process from no-load excitation of a synchronous generator to grid connection, an inverter deexcitation process after grid disconnection, or a deexcitation process after the synchronous generator receives a deexcitation switch trip order under any working condition, the method for controlling the intermediate DC current of the flexible excitation system provided by the present application controls the voltage according to the difference of the terminal voltage by adopting a conventional two-stage control strategy, the content of which is specifically as follows:

First, according to the difference of the generator terminal voltage, the interval is divided into a conventional linear step-up interval and a conventional constant voltage interval, the conventional linear step-up interval refers to a range of the generator terminal voltage from zero to the conventional knee voltage, and the conventional constant voltage interval refers to a range of the generator terminal voltage above the conventional knee voltage. In this embodiment, the conventional knee voltage is designed as 0.8 pu of the rated value of the terminal voltage.

Second, in the conventional linear step-up interval, the intermediate DC voltage of the flexible excitation system is controlled according to a fixed conventional step-up ratio setting value relative to the secondary line voltage of the excitation transformer, that is, the intermediate DC voltage is equal to the secondary line voltage of the excitation transformer multiplied by the conventional step-up ratio. In this embodiment, the conventional step-up ratio is 2.5. In the conventional constant voltage range, the intermediate DC voltage of the flexible excitation system is controlled according to a conventional fixed intermediate DC voltage setting value. In this embodiment, the conventional fixed intermediate DC voltage setting value is 2 pu of the rated value of the excitation voltage.

A relationship between the conventional knee voltage and the conventional step-up ratio and the conventional fixed intermediate DC voltage is as follows:

(conventional knee voltage/rated value of generator terminal voltage)*rated value of secondary line voltage of excitation transformer*conventional step-up ratio=conventional fixed intermediate DC voltage.

That is, 0.8 pu*1 pu (rated value of excitation voltage) *2.5=2 pu (rated value of excitation voltage).

Figure 4:
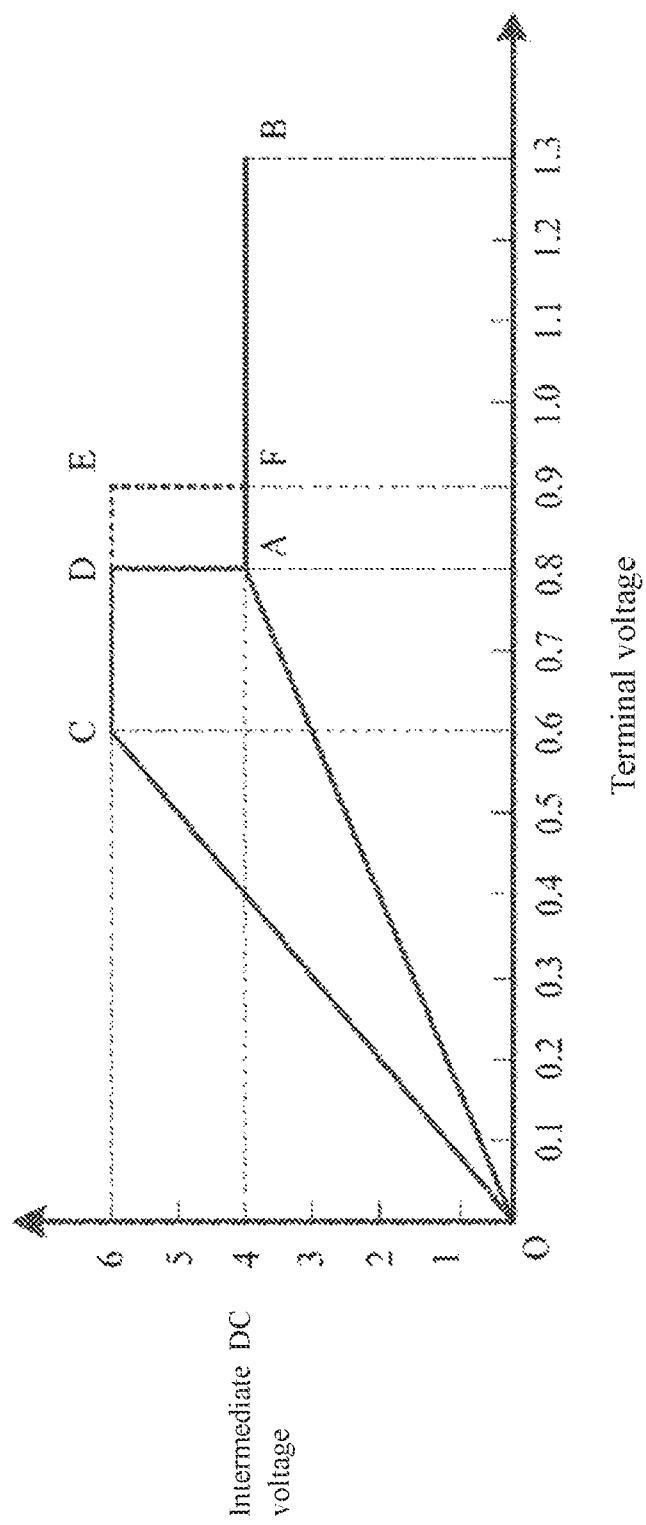
FIG. 4 illustrates a control effect diagram of a method for controlling a flexible excitation system in a specific embodiment of the present application.

The control effect of this part is as illustrated by curve OAB in FIG. 4.

In step S2, after the grid connection of the synchronous generator, the method for controlling the intermediate DC voltage of the flexible excitation system provided by the present application respectively controls the voltage according to two operation intervals of the generator terminal voltage, including a conventional operation interval in which the generator terminal voltage is higher than conventional knee voltage and an emergency operation interval in which the generator terminal voltage is lower than the conventional knee voltage.

1) When the generator terminal voltage is in the conventional operation interval, the intermediate DC voltage of the flexible excitation system is controlled according to a conventional fixed DC voltage setting value. The control effect is as illustrated by curve AFB in FIG. 3.

2) When the generator terminal voltage is in the emergency operation interval, the intermediate DC voltage of the flexible excitation system is controlled according to the difference of the generator terminal voltage by adopting the emergency two-stage control strategy, the content of which is specifically as follows:

First, according to the difference of the generator terminal voltage, the interval is divided into an emergency linear step-up interval and an emergency constant voltage interval, the emergency linear step-up interval refers to a range of the generator terminal voltage from zero to emergency knee voltage, and the emergency constant voltage interval refers to a range of the generator terminal voltage from the emergency knee voltage to normal knee voltage. In this embodiment, the emergency knee voltage is designed as 0.6 pu of the rated value of the terminal voltage.

Second, in the emergency linear step-up interval, the intermediate DC voltage of the flexible excitation system is controlled according to a fixed emergency step-up ratio setting value relative to the secondary line voltage of the excitation transformer, that is, the intermediate DC voltage is equal to the secondary line voltage of the excitation transformer multiplied by emergency step-up ratio. In this embodiment, the emergency step-up ratio is 5.0. In the emergency constant voltage interval, the intermediate DC voltage of the flexible excitation system is controlled according to a fixed emergency DC voltage setting value. In this embodiment, the emergency DC voltage setting value is 3 pu of the rated value of the excitation voltage.

A relationship between the emergency knee voltage of the generator terminal voltage and the emergency step-up ratio setting value and emergency fixed intermediate DC voltage setting value is as follows:

(emergency knee voltage/rated value of generator terminal voltage)*rated value of secondary line voltage of excitation transformer*emergency step-up ratio=emergency fixed intermediate DC voltage.

That is, 0.6 pu*1 pu (rated value of excitation voltage) *5.0=3 pu (rated value of excitation voltage).

The control effect of this part is as illustrated by curve ADCO in FIG. 4.

When the generator in a grid connected state enters the emergency operation interval, the generator terminal voltage is required to be restored within the conventional operation interval of the normal knee voltage and exceed a set control dead zone which is set as 0.1 pu in this embodiment, so that the intermediate DC voltage of the flexible excitation system is capable of being restored to be controlled according to the conventional fixed DC voltage setting value. The control effect is as illustrated by curve DEF in FIG. 3.

The dynamic ceiling voltage control method provided by this embodiment based on the flexible excitation system makes full use of the fast response control ability of the flexible excitation system, and flexibly adjusts the intermediate DC voltage according to the demand, so as to improve the forced excitation output ability of the self-shunt excitation system in case of system voltage fault and drop, and greatly improve the transient stability control ability of the power system.

In another preferred embodiment, the flexible excitation control unit in the flexible excitation system in embodiments 2-7 may be a control device, which includes a processor and a memory. When the flexible excitation control unit includes an excitation transformer overload limiter, the excitation transformer overload signal detection circuit, the excitation transformer overload state determination circuit and the excitation transformer overload action circuit included in the excitation transformer overload limiter are program modules stored in the memory; the processor is used to execute the program modules stored in the memory.

The invention claimed is:

1. A flexible excitation system, wherein the flexible excitation system comprises a plurality of groups of flexible excitation power units connected in parallel, a deexcitation circuit unit and a flexible excitation control unit;

each flexible excitation power unit comprises a front-stage bidirectional AC-DC converter and a rear-stage bidirectional DC-DC converter; the front-stage bidirectional AC-DC converter is connected with the rear-stage bidirectional DC-DC converter through an intermediate DC capacitor circuit; a three-phase AC input side of the front-stage bidirectional AC-DC converter is an input side of the flexible excitation power unit; a DC output side of the rear-stage bidirectional DC-DC converter is an output side of the flexible excitation power unit; the input sides of the plurality of groups of flexible excitation power units are respectively configured with AC side filter reactors and AC circuit breakers connected in series, then are connected in parallel, and are connected with a three-phase AC low-voltage side of an excitation transformer, and a three-phase AC high-voltage side of the excitation transformer is connected with a generator terminal; the output sides of the plurality of groups of flexible excitation power units are respectively configured with DC side filter reactors and DC circuit breakers connected in series, and then are connected in parallel for output;

the deexcitation circuit unit consists of a deexcitation switch and a deexcitation resistor circuit; the deexcitation resistor circuit consists of a nonlinear deexcitation resistor and a diode connected in series, and is connected across positive and negative poles of a generator excitation winding, a positive pole of the diode is connected with the negative pole of the generator excitation winding, a negative pole of the diode is connected with one end of the nonlinear deexcitation resistor, and the other end of the nonlinear deexcitation resistor is connected with the positive pole of the generator excitation winding;

the parallel output positive poles of the plurality of groups of flexible excitation power units are connected with the positive pole of the generator excitation winding through the deexcitation switch; the parallel output negative poles of the plurality of groups of flexible excitation power units are connected with the negative pole of the generator excitation winding or are connected with the deexcitation switch in series and then connected with the negative pole of the generator excitation winding;

the flexible excitation control unit is used to cooperatively control the AC circuit breakers and the DC circuit breakers of the flexible excitation power units and the deexcitation switch, so as to realize the internal fault-tolerant operation control of the flexible excitation power units;

the flexible excitation control unit is further used to dynamically control ceiling voltage by using the fast response control ability of the flexible excitation system when terminal voltage drops, so as to improve the forced excitation output capacity of the excitation system;

the flexible excitation control unit is further used to limit the operation state of the excitation transformer within an allowable overload operation range of equipment.

2. The flexible excitation system according to claim 1, wherein the front-stage bidirectional AC-DC converter is a three-level voltage source converter; the post-stage bidirectional DC-DC converter is a five-level H-bridge DC converter; the intermediate DC capacitor circuit comprises two groups of front-stage and rear-stage intermediate DC capacitor units connected in parallel;

a DC output side of the three-level voltage source converter is connected with the front-stage intermediate DC capacitor unit through a positive pole, a neutral point and a negative pole; a DC input side of the five-level H-bridge DC converter is connected with the rear-stage intermediate DC capacitor unit through a positive pole, a neutral point and a negative pole;

the intermediate DC capacitor unit comprises two groups of top bridge DC capacitor banks and bottom bridge DC capacitor banks connected in series, a positive pole of the top bridge DC capacitor bank is a positive pole of the intermediate DC capacitor unit, a negative pole of the top bridge DC capacitor bank is connected with a positive pole of the bottom bridge DC capacitor bank to form a neutral point of the intermediate DC capacitor unit, and a negative pole of the bottom bridge DC capacitor bank is a negative pole of the intermediate DC capacitor unit; the front-stage intermediate DC capacitor unit and the rear-stage intermediate DC capacitor unit are connected only through the positive pole and the negative pole.

3. The method for controlling the flexible excitation system according to claim 2, wherein when the excitation transformer overload limiting action signal occurs, the excitation transformer overload action circuit acts to reduce the excitation voltage output limit of the rear-stage bidirectional DC-DC converter, and makes an adjustment in real time according to the following formula: excitation voltage output limit=(conservative coefficient of limiting action*actually measured per-unit value of terminal voltage*rated voltage on secondary side of excitation transformer*rated current on secondary side of excitation transformer)/actually measured value of excitation current.

4. The method for controlling the flexible excitation system according to claim 2, wherein when the excitation transformer overload limiting action signal occurs, the excitation transformer overload action circuit acts to reduce the current limit of the input link of the front-stage bidirectional AC-DC converter, which is limited according to the following formula: current limit=conservative coefficient of limiting action rated current on secondary side of excitation transformer.

5. A method for controlling a flexible excitation system, wherein the method is applied to the flexible excitation system according to claim 1, the flexible excitation control unit comprises an excitation transformer overload limiter, and the excitation transformer overload limiter comprises an excitation transformer overload signal detection circuit, an excitation transformer overload state determination circuit and an excitation transformer overload action circuit;

the flexible excitation control unit limits the operation state of the excitation transformer within an allowable overload operation range of equipment, specifically comprising the following steps that:

the excitation transformer overload signal detection circuit is used to detect a signal indicative of an excitation transformer load operation state and transmit the signal to the excitation transformer overload state determination circuit;

the excitation transformer overload state determination circuit calculates and determines whether the excitation transformer exceeds an allowable overload operation state of equipment by using the detected signal, obtains an excitation transformer overload limiting action signal, and transmits the excitation transformer overload limiting action signal to the excitation transformer overload action circuit;

the excitation transformer overload action circuit limits the operation state of the excitation transformer within the allowable overload operation range of equipment by controlling a control process variable of the flexible excitation system after receiving the excitation transformer overload limiting action signal.

6. The method for controlling the flexible excitation system according to claim 5, wherein the excitation transformer overload signal detection circuit obtains excitation transformer temperature through a temperature measurement device; the excitation transformer overload state determination circuit obtains the excitation transformer overload limiting action signal by comparing the excitation transformer temperature with an excitation transformer overtemperature fixed value.

7. The method for controlling the flexible excitation system according to claim 5, wherein the excitation transformer overload signal detection circuit obtains excitation transformer current through a current measurement device; the excitation transformer overload state determination circuit calculates the accumulated heat of the excitation transformer winding through the excitation transformer current, and compares the accumulated heat with an excitation transformer winding overload heat fixed value to obtain the excitation transformer overload limiting action signal.

8. A method for controlling a flexible excitation system, wherein the method is applied to the flexible excitation system according to claim 1, and the flexible excitation control unit cooperatively controls the AC circuit breakers and DC circuit breakers of the flexible excitation power units and the deexcitation switch, specifically comprising the following steps that:

when a non-serious operation fault of the front-stage bidirectional AC-DC converter of any flexible excitation power unit is detected, all the front-stage bidirectional AC-DC converters of the flexible excitation power units connected in parallel are locked to enter an uncontrolled rectification operation state, and the rear-stage bidirectional DC-DC converters are limited to only allow unidirectional power output control, so as to maintain the operation of the flexible excitation system;

when a serious operation fault of the front-stage bidirectional AC-DC converter of any flexible excitation power unit and a fault of the rear-stage bidirectional DC-DC converter are detected, and there are still other flexible excitation power units capable of maintaining the normal operation of a generator set, the AC circuit breaker and DC circuit breaker of the flexible excitation power unit are immediately controlled to trip, and the fault power unit is removed from the parallel system so that the remaining system operates normally;

when a serious operation fault of the front-stage bidirectional AC-DC converter of any flexible excitation power unit and a fault of the rear-stage bidirectional DC-DC converter are detected, and the remaining other flexible excitation power units are not capable of maintaining the normal operation of the generator set, the deexcitation switch of the flexible excitation system is immediately controlled to trip so that the entire system stops operating.

9. The method for controlling the flexible excitation system according to claim 8, wherein the non-serious operation fault of the front-stage bidirectional AC-DC converter refers to a fault form such as abnormal locking of control pulse or phase-locked instability which does not cause a serious loss to equipment; the serious operation fault of the front-stage bidirectional AC-DC converter refers to a fault form such as overcurrent or overvoltage which causes a serious loss to equipment.

10. A method for controlling a flexible excitation system, wherein the method is applied to the flexible excitation system according to claim 1, the intermediate DC voltage of the intermediate DC capacitor circuit is the ceiling voltage of the flexible excitation system and is called the intermediate DC voltage of the flexible excitation system; when the terminal voltage drops, the flexible excitation control unit dynamically controls the ceiling voltage by using the fast response control ability of the flexible excitation system, specifically comprising the following steps:

S1: in a process from no-load excitation of a synchronous generator to grid connection, an inverter deexcitation process after grid disconnection, or a deexcitation process after the synchronous generator receives a deexcitation switch trip order under any working condition, controlling the intermediate DC voltage of the flexible excitation system according to the change of the terminal voltage by adopting a conventional two-stage control strategy;

S2: after the grid connection of the synchronous generator, controlling the intermediate DC voltage of the flexible excitation system according to two operation intervals of the generator terminal voltage, comprising a conventional operation interval in which the generator terminal voltage is higher than conventional knee voltage and an emergency operation interval in which the generator terminal voltage is lower than the conventional knee voltage;

A1) when the generator terminal voltage is in the conventional operation interval, controlling the intermediate DC voltage of the flexible excitation system according to a conventional fixed DC voltage setting value;

A2) when the generator terminal voltage is in the emergency operation interval, controlling the intermediate DC voltage of the flexible excitation system according to the change of the generator terminal voltage by adopting the emergency two-stage control strategy.

11. The method for controlling the flexible excitation system according to claim 10, wherein the conventional two-stage control strategy specifically comprises the following content:

according to the difference of the generator terminal voltage, the interval is divided into a conventional linear step-up interval and a conventional constant voltage interval, the conventional linear step-up interval refers to a range of the generator terminal voltage from zero to the conventional knee voltage, and the conventional constant voltage interval refers to a range of the generator terminal voltage above the conventional knee voltage;

in the conventional linear step-up interval, the intermediate DC voltage of the flexible excitation system is controlled according to a fixed conventional step-up ratio setting value relative to the secondary line voltage of the excitation transformer, that is, the intermediate DC voltage is equal to the secondary line voltage of the excitation transformer multiplied by the conventional step-up ratio; in the conventional constant voltage range, the intermediate DC voltage of the flexible excitation system is controlled according to a conventional fixed intermediate DC voltage setting value.

12. The method for controlling the flexible excitation system according to claim 10, wherein a relationship between the conventional knee voltage and the conventional step-up ratio and the conventional fixed intermediate DC voltage is as follows:

(conventional knee voltage/rated value of generator terminal voltage)*rated value of secondary line voltage of excitation transformer*conventional step-up ratio=conventional fixed intermediate DC voltage.

13. The method for controlling the flexible excitation system according to claim 10, wherein the emergency two-stage control strategy specifically comprises the following content:
according to the difference of the generator terminal voltage, the interval is divided into an emergency linear step-up interval and an emergency constant voltage interval, the emergency linear step-up interval refers to a range of the generator terminal voltage from zero to emergency knee voltage, and the emergency constant voltage interval refers to a range of the generator terminal voltage from the emergency knee voltage to normal knee voltage;
in the emergency linear step-up interval, the intermediate DC voltage of the flexible excitation system is controlled according to a fixed emergency step-up ratio setting value relative to the secondary line voltage of the excitation transformer, that is, the intermediate DC voltage is equal to the secondary line voltage of the excitation transformer multiplied by emergency step-up ratio; in the emergency constant voltage interval, the intermediate DC voltage of the flexible excitation system is controlled according to a fixed emergency DC voltage setting value.

14. The method for controlling the flexible excitation system according to claim 13, wherein a relationship between the emergency knee voltage of the generator terminal voltage and the emergency step-up ratio and emergency fixed intermediate DC voltage setting value is as follows:

(emergency knee voltage/rated value of generator terminal voltage)*rated value of secondary line voltage of excitation transformer*emergency step-up ratio=emergency fixed intermediate DC voltage.

15. The method for controlling the flexible excitation system according to claim 10, wherein when the generator in a grid connected state enters the emergency operation interval, the generator terminal voltage is required to be restored within the conventional operation interval of the normal knee voltage and exceed a set control dead zone so that the intermediate DC voltage of the flexible excitation system is capable of being restored to be controlled according to the conventional fixed DC voltage setting value.

* * * * *